UNITED STATES PATENT OFFICE.

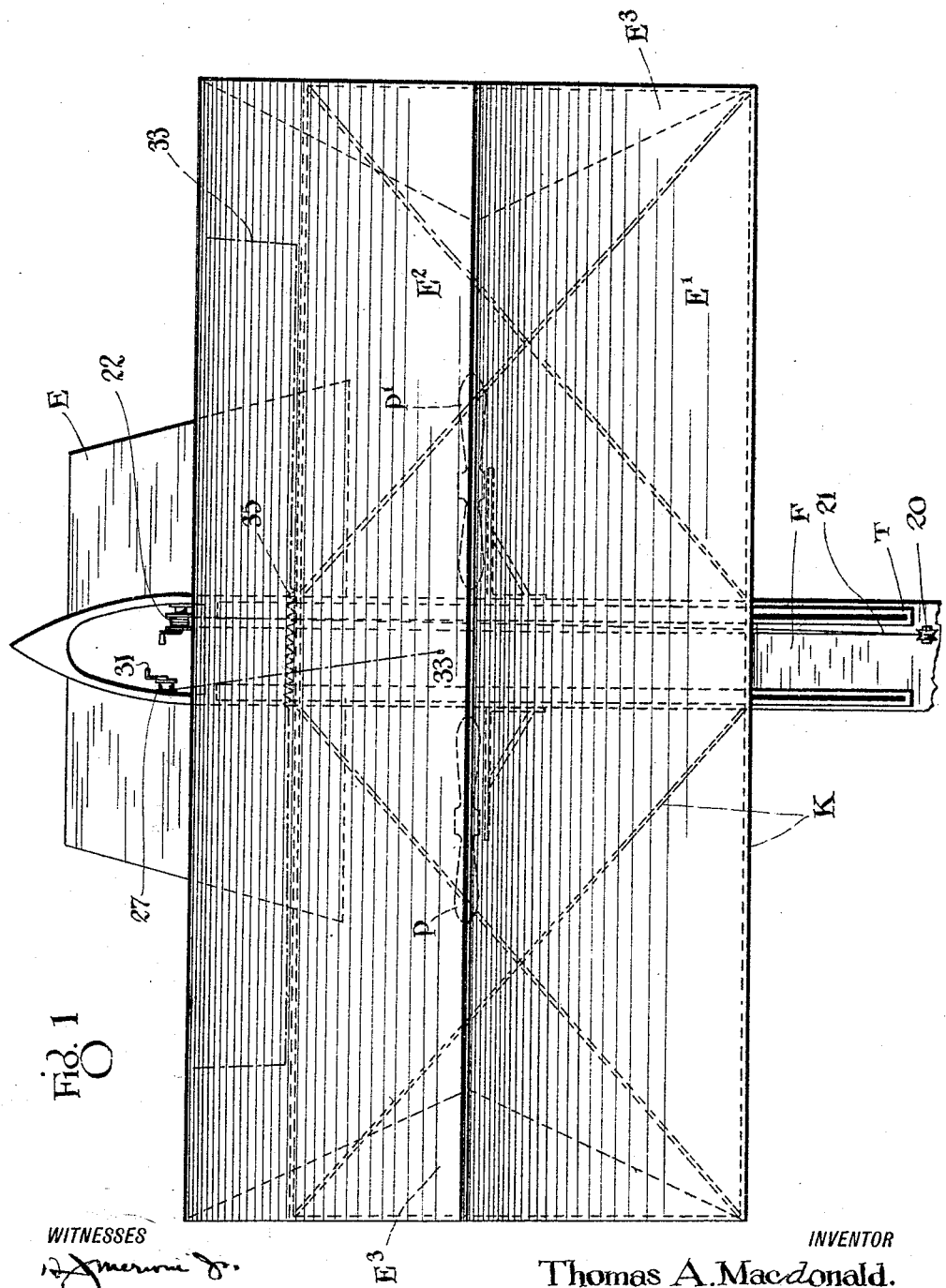

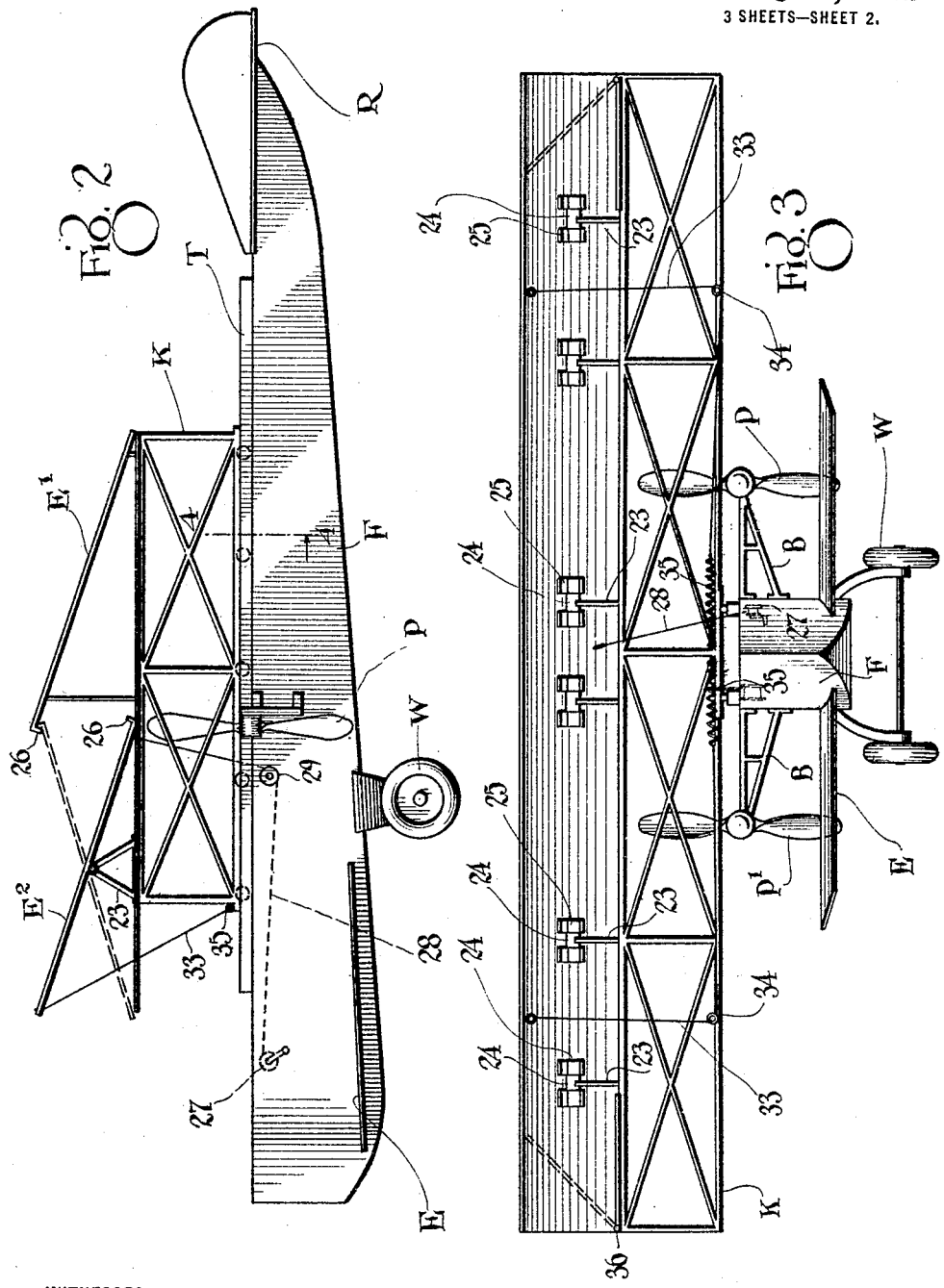

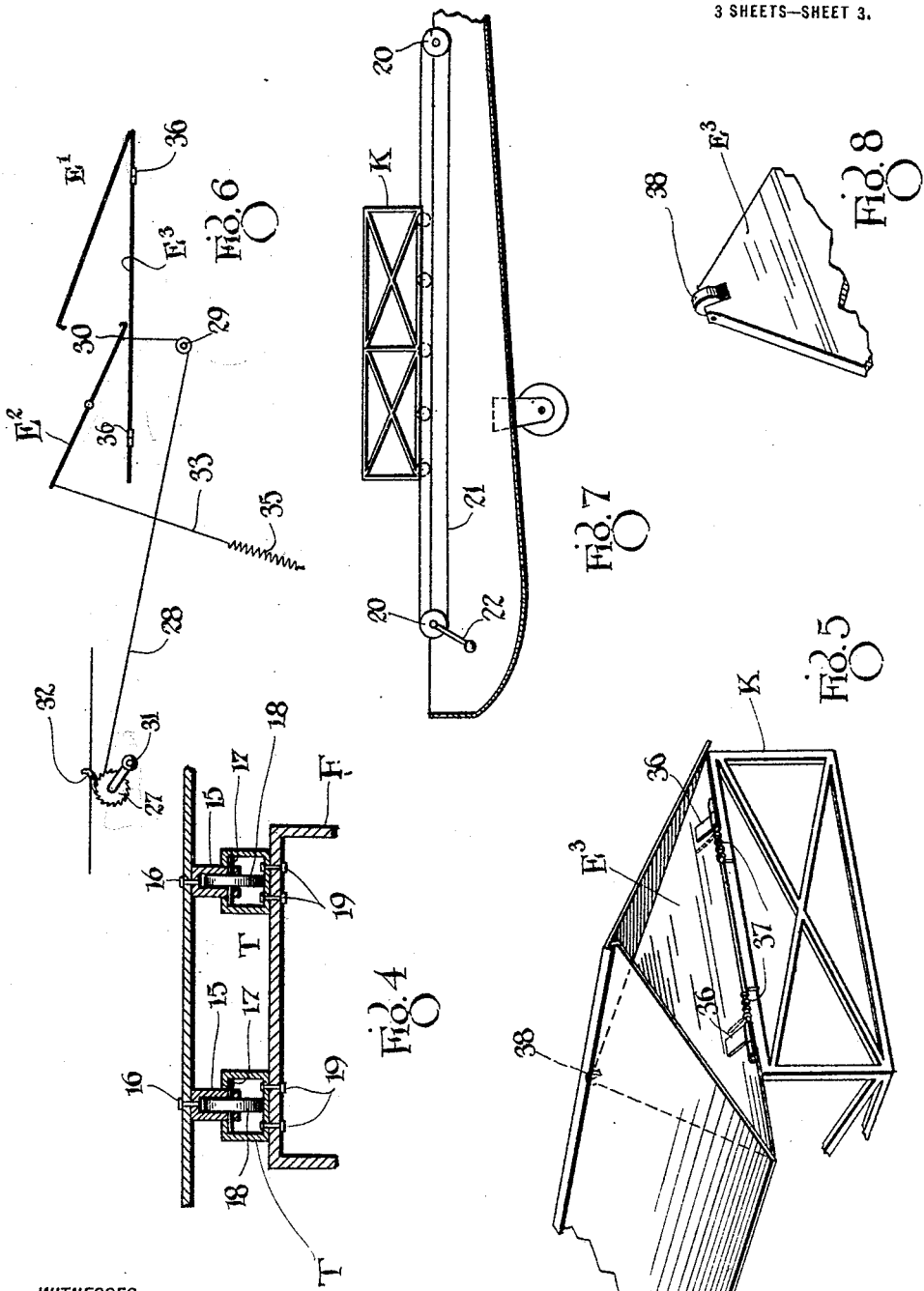

THOMAS ANTHONY MACDONALD, OF PATERSON, NEW JERSEY.

AEROPLANE.

1,389,257.      Specification of Letters Patent.      Patented Aug. 30, 1921.

Application filed May 26, 1920. Serial No. 384,286.

*To all whom it may concern:*

Be it known that I, THOMAS ANTHONY MACDONALD, a subject of the King of Great Britain, and a resident of Paterson, in the county of Passaic and State of New Jersey, have invented certain new and useful Improvements in Aeroplanes, of which the following is a specification.

My invention relates to aeroplanes, and a purpose of my invention is the provision of an aeroplane in which a plurality of planes that normally function as lifting planes are capable of being manipulated to form a parachute for retarding the fall of the aeroplane to the ground in the event of an accident such as the failure of the motor to continue its operations, the parachute as a whole being capable of quick adjustment along the fuselage to occupy the most advantageous positions for retarding the fall of the aeroplane to the greatest possible degree and of maintaining the machine upright during its gradual downward travel to the earth.

It is also a purpose of my invention to provide an aeroplane in which one of the parachute planes when in its normal position coacts with a head or front stationary plane to direct a shaft of air into the path of propellers located at opposite sides of the fuselage, whereby, the propelling and lifting force of the propellers is materially increased.

I will describe one form of aeroplane embodying my invention and will then point out the novel features thereof in claims.

In the accompanying drawings:

Figure 1 is a view showing in top plan one form of aeroplane embodying my invention.

Fig. 2 is a view showing in side elevation the aeroplane shown in Fig. 1.

Fig. 3 is a view showing in front elevation the aeroplane shown in the preceding views.

Fig. 4 is a vertical fragmentary sectional view taken on the line 4—4 of Fig. 2.

Fig. 5 is a fragmentary perspective view of a portion of certain of the planes when in parachute formation.

Fig. 6 is a diagrammatic view showing the mechanism for actuating the movable plane embodied in the parachute.

Fig. 7 is also a diagrammatic view showing the actuating means for the carriage shown in Figs. 2 and 3.

Fig. 8 is a fragmentary detail view of one of the end planes forming the parachute.

Similar reference characters refer to similar parts in each of the several views.

Referring specifically to the drawings and particularly to Figs. 1, 2 and 3, F designates a fuselage of standard construction supported in the usual manner by wheels W, and provided with a rudder R at the rear end thereof. As shown in Fig. 3, the propellers P and P' are supported at opposite sides of the fuselage by means of brackets B, the driving means for the propellers having been omitted in order to simplify the drawings. These propellers as shown are of standard construction, but in actual practice I propose to use the propellers embodied in my Patent No. 1,135,829, patented April 13, 1915, I having found that propellers constructed in accordance with my patent are more responsive to the shaft of air directed thereon by certain planes as will be hereinafter described.

As illustrated to advantage in Figs. 2 and 3, the forward end of the fuselage is provided with a plane E formed of two sections secured to the fuselage at opposite sides thereof and at corresponding points. As shown in Fig. 2, the plane E is inclined upwardly in the direction of the propellers P and P' with its rear end disposed in a plane slightly above the lower ends of the propeller blades when the latter are in vertical positions.

Referring now to Figs. 2, 4 and 7, I have here shown a carriage designated generally at K and formed of a skeleton framework which is sufficiently rigid to perform the function for which it is intended while at the same time offering the least possible resistance to the air. As shown in Fig. 4, the lower side of the carriage K is provided with channel bars 15 secured thereto by bolts 16. Journaled at intervals within the channel bars 15 are stub axles 17 upon each of which is fixed a wheel 18. The wheels 18 are adapted to move over the rails of a track designated at T and which as shown in Fig. 4 are of substantially C-shape in cross section, their opposite ends being closed so as to provide the necessary stops for preventing the rolling of the wheels off of the ends of the track. The rails of the track T are secured to the upper side of the fuselage F by means of bolts 19, and as shown in Fig. 1, such track extends longitudinally of the fuselage so as to permit of the longitudinal adjustment of the carriage K. As shown in Fig. 4, the channel bars 15 are disposed within the openings of the upper side of the rails T, with the stub axles 17 engaging the under sides of the top of the rails so as to prevent upward displacement of the wheels from the tracks. To effect the longitudinal movement of the carriage K along the track T I provide any suitable means such as that shown in Fig. 7 which comprises a pair of pulleys 20 arranged adjacent the opposite ends of the track T and about which is trained a cable 21. The opposite ends of the cable 21 are connected to the opposite ends of the carriage K so that when one of the pulleys 20 is rotated in one direction or the other, a longitudinal movement of the carriage K in either direction is effected. To actuate one of the pulleys 20, I have provided a crank 21$^a$ secured to the shaft of the forward pulley so that it can be actuated by the operator occupying the seat at the forward end of the fuselage as shown in Fig. 2.

As illustrated to advantage in Fig. 2, the carriage K has fixed to its upper side a stationary plane E' which is inclined forwardly in the direction of the forward end of the fuselage. Arranged upon the carriage K in advance of the stationary plane E' is a movable plane E$^2$ which is pivotally supported along its longitudinal axis by means of standards 23 secured at intervals to the carriage K as shown in Fig. 3 and supporting at their upper ends stub axles 24 journaled in bearings 25 secured to the under side of the plane E$^2$. The movable plane E$^2$ by virtue of its mounting is capable of occupying one extreme position in which it is disposed parallel to the plane E' as shown in Fig. 2, and another extreme position in which it is inclined with respect to the plane E' as shown in dash lines in Fig. 2. In this latter extreme position, the trailing edge of the plane E$^2$ engages the forward edge of the plane E' to form the parachute. In the other extreme position of the plane E$^2$, it functions as a lifting plane and at the same time permitting the stationary plane E' to also function as a lifting plane. The confronting edges of the planes E' and E$^2$ are provided with reversely disposed lips 26 which are adapted to engage each other when the plane E$^2$ is in its second extreme position in a manner to effect an interlocking of the movable plane with the stationary plane so that a parachute form will be maintained. An air-tight connection between the confronting edges of the two planes may be procured by providing the confronting faces of the lips 26 with suitable packing (not shown) so that when the planes are in parachute formation, air will be trapped beneath the planes to effect a retardation of the aeroplane when it is falling toward the ground.

For actuating the movable plane E$^2$ to cause it to occupy either of its extreme positions, I provide suitable mechanism which is adapted to be controlled from the operator's seat. As shown in Fig. 6, this mechanism comprises in the present instance a windlass 27 about which is trained one end of a cable 28, which passes over a pulley 29 and has its opposite end secured to the under side of the plane E$^2$ as indicated at 30. The windlass 27 is provided with a crank 31 for actuating the same, and with pawl and ratchet means indicated at 32 for effecting the locking of the windlass against rotation in a clockwise direction to prevent the unwinding of the cable 28. As illustrated to advantage in Fig. 3, cables 33 are connected at one of their ends to the plane E$^2$ at its forward edge, and are then trained about pulleys 34 supported on the carriage K, with their opposite ends secured to the opposite ends of a coiled contractile spring 35.

By this arrangement it will be seen that the spring 35 functions to bias the plane E$^2$ to the position shown in dash lines in Fig. 2, and that by actuating the windlass 27 to wind the cable 28 thereabout, the plane E$^2$ can be moved to its other extreme position against the tension of the spring 35. If it is desired to return the plane E$^2$ from its parallel position with respect to the plane E' to the inclined or parachute position, it will be clear that by moving the pawl to disengage the ratchet, the windlass 27 will be free to rotate under the action of the spring 35 so as to effect an unwinding of the cable 28 to allow the plane to move to the inclined position.

In conjunction with the planes E' and E$^2$ I also provide a pair of end planes E$^3$ which as shown in Fig. 5 are of triangular formation and of such an area as to completely span the planes at points adjacent their opposite ends, when in elevated position. The planes E$^3$ are hingedly connected to the opposite ends of the carriage K as indicated at 36 in Fig. 5, and these planes are biased to vertical inclined positions by means of coiled springs 37 arranged in the manner shown in Fig. 5. As will be understood from a consideration of Fig. 6, the end planes E$^3$ are caused to occupy a horizontal position wherein the movable plane E$^2$ occupies a parallel position with respect to the plane E', the trailing edge of the plane E$^2$ engaging the end planes so as to prevent upward movement thereof under the action of the springs 37. However, when the plane E$^2$ is moved to the inclined position as shown in dotted lines in Fig. 2, the springs 37 are then free to function so that the end planes move into elevated position as shown in Fig. 5. To prevent injury to the planes E' and E² when the end planes move to elevated position, the apex of each end plane is provided with a roller 37 preferably formed of rubber which is adapted to abut the confronting edges of the planes E' and E² in the manner shown in Fig. 2 and to allow of a lateral or outward movement of the planes in moving into complete spanning position. With the end planes in elevated or spanning position as shown in Fig. 5, it will be clear that they close the ends of the pocket formed by such planes and thus produce a more effective parachute than is possible by the employment of only the planes E' and E². As the end planes E³ are also mounted upon the carriage K, it will be clear that by an actuation of the crank 22, the completely formed parachute can be moved longitudinally of the fuselage to any desired point within the length of the track T.

In the operation of the aeroplane, the plane E² normally occupies a parallel position as shown in solid lines in Fig. 2, and in this position both planes E' and E² function as lifting planes so as to effect the lifting of the machine under the action of the propellers P and P'. In the normal position of the carriage K, the plane E² has its trailing edge disposed directly above the propellers P and P', and in this position of the plane E² it is to be particularly noted that such plane is disposed in convergent or divergent relation with respect to the plane E. As a result of this arrangement, the two planes E and E² coöperate during the movement of the aeroplane to direct a shaft of air onto the propellers P and P', this air being compressed to a certain degree so as to form a solid mass, as it were, in which the propellers are adapted to rotate. The resulting action of the propellers working in this column of air is to materially increase the propelling and lifting force of the propellers without materially increasing the power applied to the propellers.

As long as the aeroplane properly functions, the carriage K and the plane E² maintain their normal position. However, in the event of an accident such as the failure of the motor to continue its operations, so that the aeroplane is incapable of continuing its flight, the plane E² is moved to engage the plane E' thereby releasing the end planes E³ and forming the complete parachute. As soon as the parachute is formed, the trapping of a sufficient quantity of air is made to retard the fall of the aeroplane to the ground. Should the parachute in its normal position cause a tilting of the aeroplane in one direction or the other, it will be clear that by adjusting the carriage longitudinally, the parachute can be manipulated to maintain the machine upright during its gradual downward travel to the earth and thereby permit of a safe landing of the aeroplane.

From the foregoing description taken in conjunction with the accompanying drawings it will be manifest that I have provided means for increasing the propelling and lifting force of the propellers of an aeroplane, while at the same time I provide means for permitting of the safe landing of an aeroplane in the event of an accident.

Although I have herein shown and described only one form of aeroplane embodying my invention, it is to be understood that various changes and modifications may be made herein without departing from the spirit of the invention and the spirit and scope of the appended claims.

What I claim is:

1. An aeroplane comprising, a fuselage, a plane fixed to the fuselage, and a pair of planes movable longitudinally along the fuselage and capable of occupying a lifting position and another position in which they coact to form a parachute.

2. An aeroplane comprising, a fuselage, a plane, and a second plane movable relatively to the first plane and capable of occupying one extreme position wherein it coacts with the first plane to provide a parachute, and another extreme position in which both of the planes function as lifting planes, propellers carried by the fuselage, and a third plane fixed to the fuselage and adapted to coact with the second plane when the latter is in the second extreme position to direct a shaft of air into the path of said propellers.

3. An aeroplane comprising, a fuselage, a track on the fuselage, a carriage movable over said track, a plane fixed to said carriage, a second plane pivotally supported on the carriage and movable to occupy one extreme position wherein the two planes coact with each other to provide a parachute, and another extreme position in which both of the planes function as lifting planes.

4. An aeroplane comprising, a fuselage, a track on the fuselage, a carriage movable over said track, a plane fixed to said carriage, a second plane pivotally supported on the carriage and movable to occupy one extreme position wherein the two planes coact with each other to provide a parachute, and another extreme position in which both of the planes function as lifting planes, and manually operable means for moving said carriage along said track.

5. An aeroplane comprising, a fuselage, a track on the fuselage, a carriage movable over said track, a plane fixed to said carriage, a second plane movably supported on said carriage and capable of occupying one extreme position in which it coacts with the first plane to provide a parachute, and a second extreme position in which both of said planes are caused to function as lifting planes, propellers carried by said fuselage, and a third plane fixed to said fuselage and adapted to coact with the movable plane when the latter is in the second extreme position to direct a shaft of air on the said propellers.

6. An aeroplane comprising, a fuselage, propellers arranged at opposite sides of the fuselage and intermediate its ends, a plane fixed to the fuselage at the forward end thereof, a carriage movable on the fuselage, a stationary plane on the carriage, a movable plane on the carriage and capable of occupying one extreme position in which it coacts with the plane fixed to the fuselage to direct a shaft of air to said propellers, and another extreme position in which it coacts with the stationary plane to form an air trap adapted to retard the descent of the aeroplane.

7. An aeroplane comprising, a fuselage, propellers arranged at opposite sides of the fuselage and intermediate its ends, a plane fixed to the fuselage at the forward end thereof, a carriage movable on the fuselage, a stationary plane on the carriage, a movable plane on the carriage and capable of occupying one extreme position in which it coacts with the plane fixed to the fuselage to direct a shaft of air to said propellers, and another extreme position in which it coacts with the stationary plane to form an air trap, and end planes on the carriage movable to span the ends of the planes on the carriage when the movable plane is in the second extreme position.

8. An aeroplane comprising, a fuselage, propellers arranged at opposite sides of the fuselage intermediate its ends, a plane fixed to the fuselage at the forward end thereof and inclined upwardly, a carriage movable on the fuselage, a stationary plane on the carriage, and a movable plane on the carriage and capable of occupying one extreme position in which it is disposed in converging relation with respect to the plane fixed to the fuselage, and another extreme position wherein it coacts with the stationary plane to form an air trap.

9. An aeroplane comprising, a fuselage, propellers arranged at opposite sides of the fuselage intermediate its ends, a plane fixed to the fuselage at the forward end thereof and inclined upwardly and rearwardly, a carriage movable on the fuselage, a stationary plane on the carriage, and a movable plane on the carriage and capable of occupying one extreme position in which it is disposed in converging relation with respect to the plane fixed to the fuselage, and another extreme position wherein it coacts with the stationary plane to form an air trap, and end planes on the carriage movable to span the ends of the planes on the carriage when the movable plane is in the second extreme position.

10. An aeroplane comprising, a fuselage, a track on the fuselage, a carriage movable over said track, a stationary plane fixed to the carriage, a movable plane pivoted on the carriage and capable of occupying parallel and inclined positions with respect to the first plane, and manually operable means for moving said carriage along said track and for moving the movable plane to either of its two positions.

11. An aeroplane comprising, a fuselage, an inclined plane above the fuselage, a second plane above the fuselage movable relative to the first plane and adapted to occupy inclined and parallel positions with relation to the first plane, and end planes adapted to span the ends of the first two planes when the second plane occupies an inclined position.

12. An aeroplane comprising, a fuselage, an inclined plane above the fuselage, a second plane above the fuselage movable relative to the first plane and adapted to occupy inclined and parallel positions with relation to the first plane, end planes adapted to span the ends of the first two planes when the movable plane occupies an inclined position, and means for supporting all of said planes for movement longitudinally of the fuselage.

13. An aeroplane comprising, a fuselage, propellers arranged at opposite sides and between the ends of the fuselage, a plane fixed to the fuselage in advance of the propellers and inclined upwardly in the direction of the propellers, a carriage movable longitudinally on and above the fuselage, a stationary plane fixed to the carriage, a movable plane in advance of the stationary plane and capable of occupying parallel and inclined positions with respect to the stationary plane, end planes movably supported on the carriage and adapted to span the ends of the stationary and movable planes when the movable plane occupies an inclined position, and manually operable means for moving said carriage longitudinally of the fuselage and for moving the movable plane to either of its positions.

14. An aeroplane comprising, a fuselage, a track on the fuselage, a carriage, wheels on the carriage movable over said track and locked against vertical displacement on the rails thereof, a stationary plane fixed to the carriage, a movable plane capable of occupying inclined and parallel positions with respect to the first plane, and end planes movable to span the ends of said planes when the movable plane is in inclined position.

15. An aeroplane comprising, a fuselage, a carriage movable on the fuselage, a stationary plane fixed to the carriage, a movable plane in advance of the stationary plane and capable of occupying inclined and parallel positions with respect to the first plane, and lips formed on the confronting edges of said planes for effecting a locking of the two planes when the movable plane is in inclined position.

16. An aeroplane comprising, a fuselage, a carriage movable on the fuselage, a stationary plane fixed to the carriage, a movable plane in advance of the stationary plane and capable of occupying inclined and parallel positions with respect to the first plane, lips formed on the confronting edges of said planes for effecting a locking of the two planes when the movable plane is in inclined position, end planes on the carriage movable to span the ends of the first two planes when the movable plane occupies the inclined position, and rollers carried by the end planes and adapted to engage the first planes when the end planes are in spanning position for the purpose described.

THOMAS ANTHONY MACDONALD.